US 10,741,816 B2
Aug. 11, 2020

(12) United States Patent
Ogawa et al.

(54) BATTERY MODULE

(71) Applicant: KABUSHIKI KAISHA TOSHIBA, Minato-ku (JP)

(72) Inventors: Takaya Ogawa, Kawasaki (JP); Shinya Aikawa, Hamura (JP); Masato Iwata, Tokyo (JP); Keitaro Hino, Tokyo (JP); Hiroaki Asai, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 125 days.

(21) Appl. No.: 15/639,731

(22) Filed: Jun. 30, 2017

(65) Prior Publication Data

US 2018/0261821 A1 Sep. 13, 2018

(30) Foreign Application Priority Data

Mar. 7, 2017 (JP) .................................. 2017-043184

(51) Int. Cl.
*H01M 2/18* (2006.01)
*H01M 2/10* (2006.01)
*H01M 2/20* (2006.01)
*H01M 10/04* (2006.01)

(52) U.S. Cl.
CPC .......... *H01M 2/18* (2013.01); *H01M 2/1016* (2013.01); *H01M 2/1077* (2013.01); *H01M 2/202* (2013.01); *H01M 2/206* (2013.01); *H01M 10/0468* (2013.01); *H01M 10/0481* (2013.01); *H01M 10/0486* (2013.01)

(58) Field of Classification Search
None
See application file for complete search history.

(56) References Cited

U.S. PATENT DOCUMENTS

| 8,158,278 B2 | 4/2012 | Tsutsumi et al. |
| 2011/0027630 A1* | 2/2011 | Tsutsumi .............. H01M 2/024 429/53 |
| 2011/0262797 A1 | 10/2011 | Kim |
| 2012/0177958 A1 | 7/2012 | Tsutsumi et al. |

(Continued)

FOREIGN PATENT DOCUMENTS

| FR | 3 023 416 A3 | 1/2016 |
| JP | 2009-87761 A | 4/2009 |

(Continued)

OTHER PUBLICATIONS

Shrim et al. (WO 0036668) (a raw machine translation) (Abstract) (Jun. 22, 2000) (Year: 2000).*

(Continued)

*Primary Examiner* — Carmen V Lyles-Irving
(74) *Attorney, Agent, or Firm* — Oblon, McClelland, Maier & Neustadt, L.L.P.

(57) ABSTRACT

According to one embodiment, a battery module includes a block-like battery cell unit in which a plurality of battery cells and a plurality of separators are stacked, and a frame which constrains the battery cell unit in a stacking direction of the battery cells and the separators. The frame is opposed to angular portions of end separators located at respective ends of the battery cell unit, as viewed in the stacking direction, and defines gaps with reference to the angular portions of the end separators.

11 Claims, 19 Drawing Sheets

(56) References Cited

U.S. PATENT DOCUMENTS

| | | | |
|---|---|---|---|
| 2013/0146249 A1* | 6/2013 | Katayama | F28F 9/00 |
| | | | 165/46 |
| 2013/0252075 A1 | 9/2013 | Shimizu et al. | |
| 2014/0014418 A1 | 1/2014 | Komaki et al. | |
| 2014/0087231 A1* | 3/2014 | Schaefer | H01M 2/1072 |
| | | | 429/120 |
| 2015/0079452 A1 | 3/2015 | Park et al. | |
| 2015/0340669 A1 | 11/2015 | Aoki | |
| 2015/0349394 A1 | 12/2015 | Hayashida et al. | |
| 2016/0036103 A1 | 2/2016 | Yamamoto et al. | |
| 2016/0141566 A1 | 5/2016 | Hamada | |
| 2016/0344011 A1 | 11/2016 | Ogawa et al. | |
| 2017/0005313 A1 | 1/2017 | Ogawa et al. | |
| 2017/0033336 A1* | 2/2017 | Hoshino | H01M 2/1077 |

FOREIGN PATENT DOCUMENTS

| | | |
|---|---|---|
| JP | 2013-161681 A | 8/2013 |
| JP | 2013-197017 A | 9/2013 |
| JP | 2013-235728 A | 11/2013 |
| JP | 2016-219270 A | 12/2016 |
| JP | 2017-16856 A | 1/2017 |
| WO | WO 00/36668 A1 | 6/2000 |
| WO | WO 2014/024431 A1 | 2/2014 |
| WO | WO 2015/012292 A1 | 1/2015 |

OTHER PUBLICATIONS

Shrim et al. (WO 0036668) (a raw machine translation) (Detailed Description) (Jun. 22, 2000) (Year: 2000).*
Shrim et al. (WO 0036668) (a raw machine translation) (Drawings) (Jun. 22, 2000) (Year: 2000).*
Extended European Search Report dated Jul. 31, 2017 in Patent Application No. 17177616.4.
Office Action dated Feb. 14, 2017 in Australian Patent Application No. 2016204458.

* cited by examiner

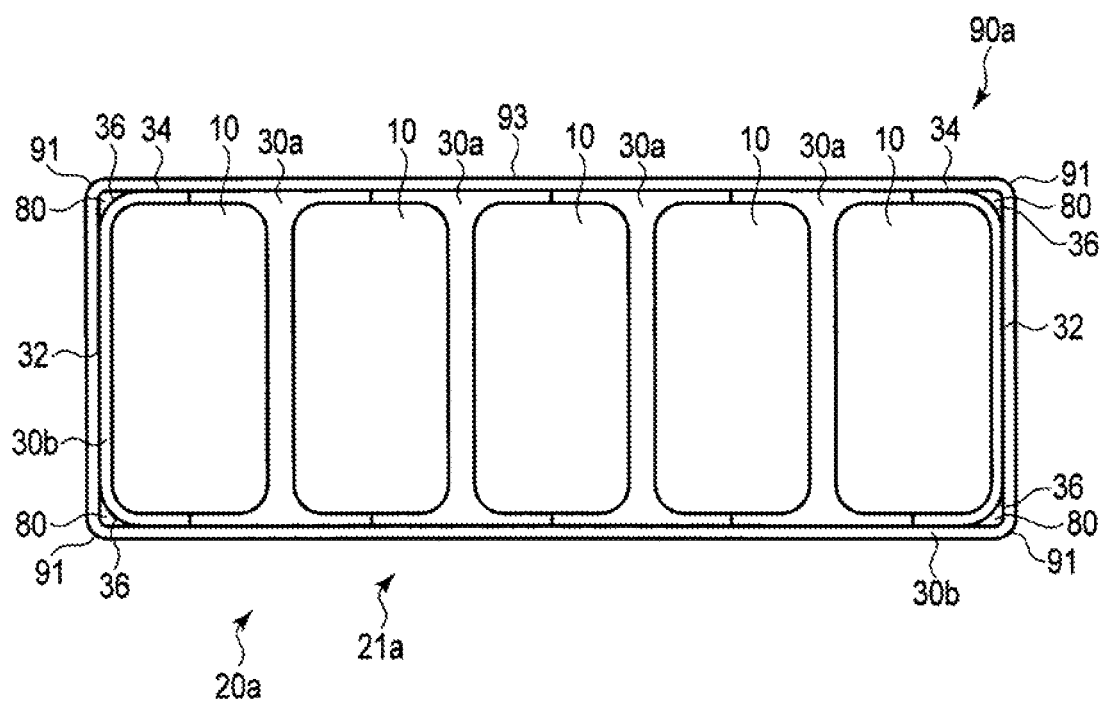
F I G. 3

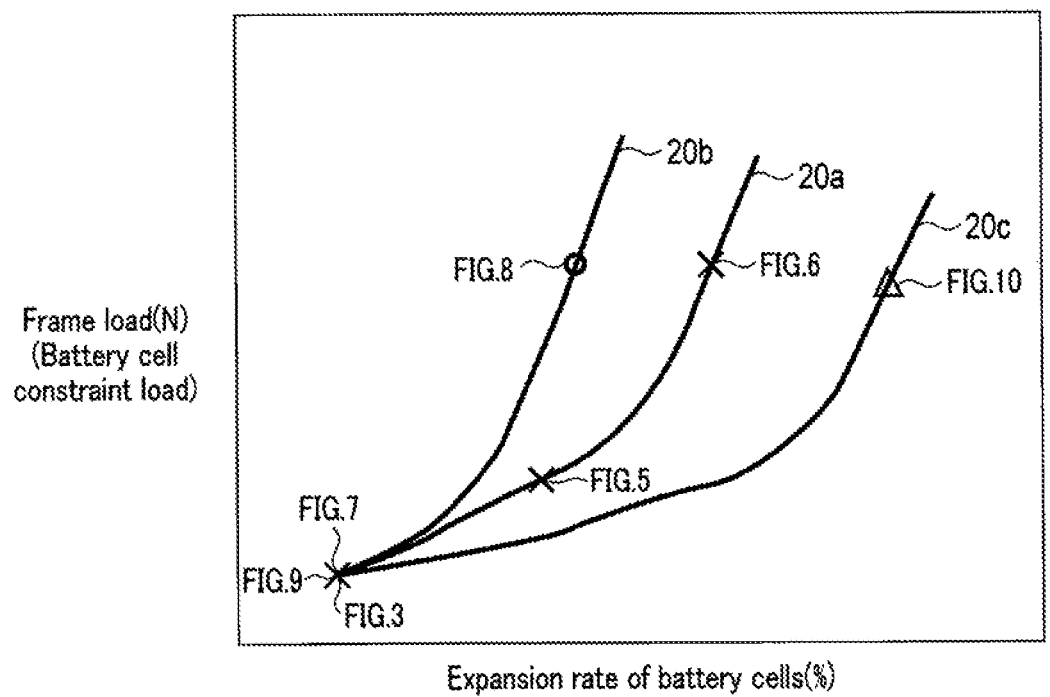
F I G. 11

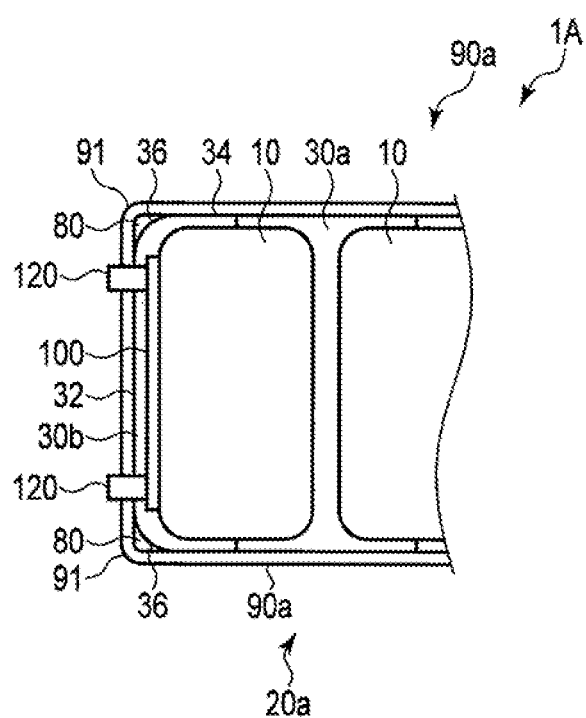
F I G. 15
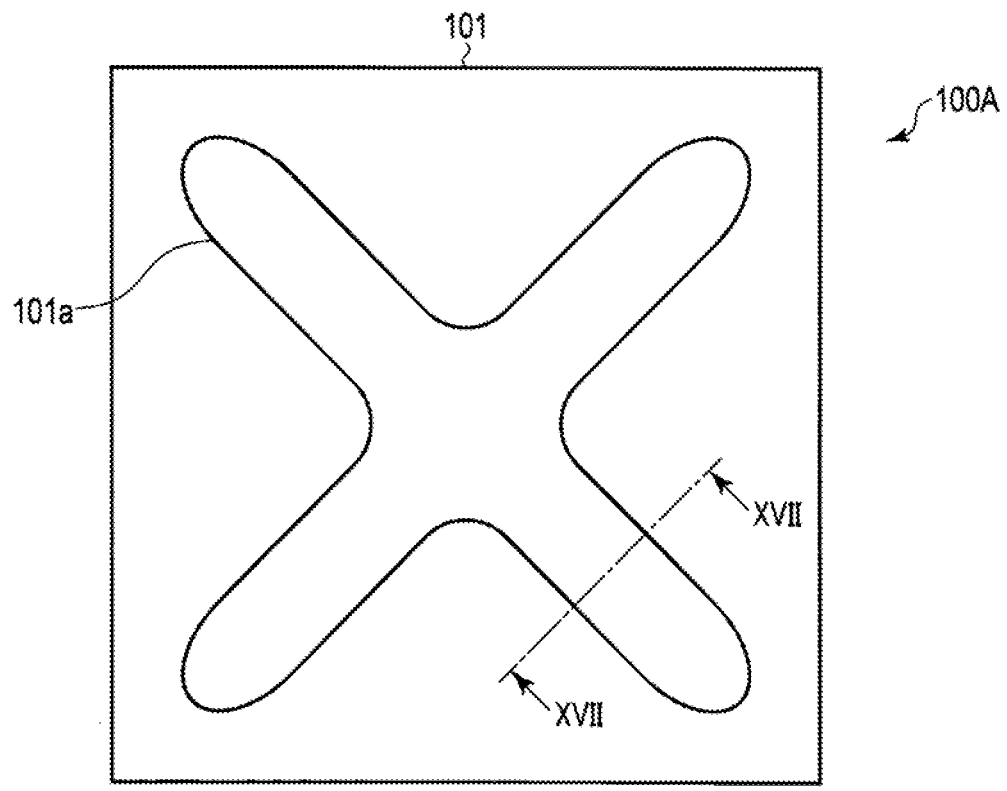
F I G. 16

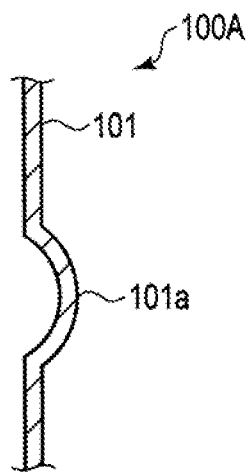
F I G. 17
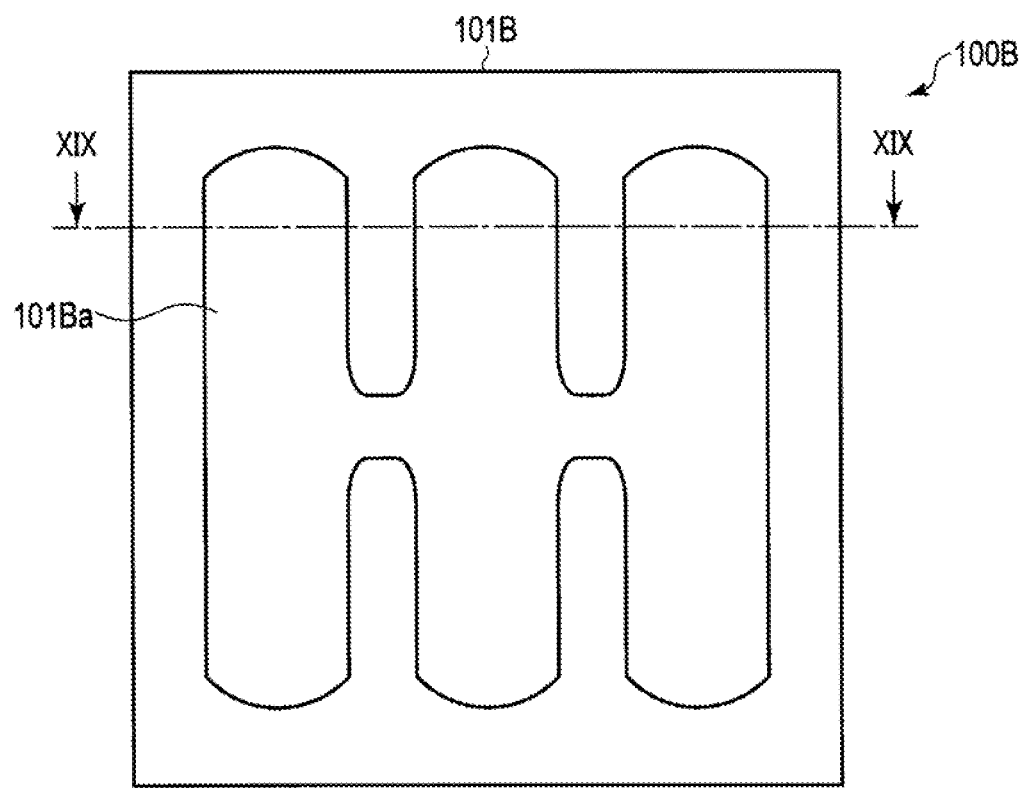
F I G. 18

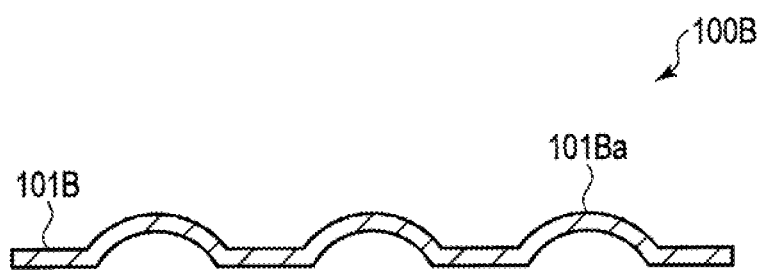
F I G. 19

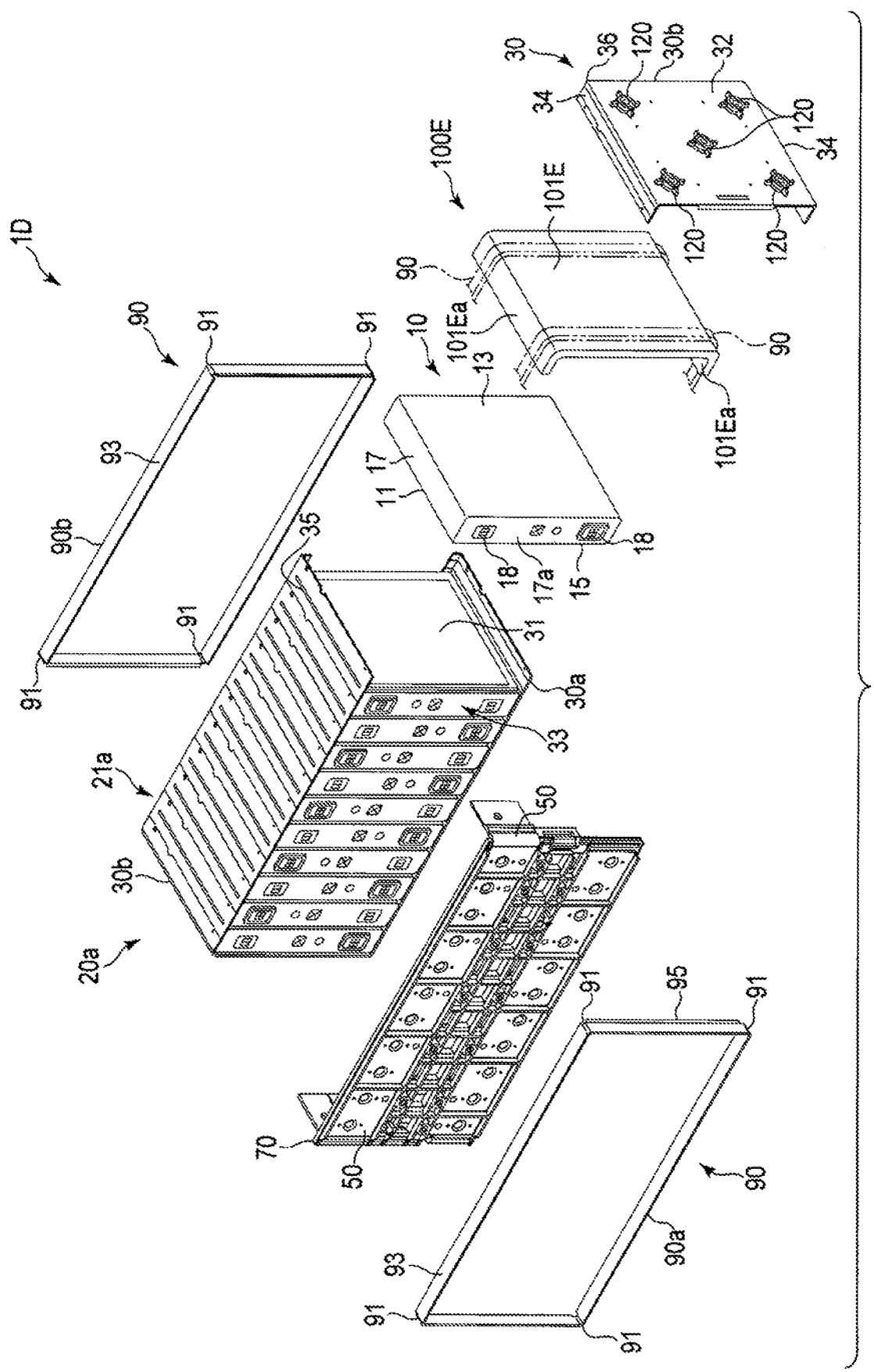
F I G. 22

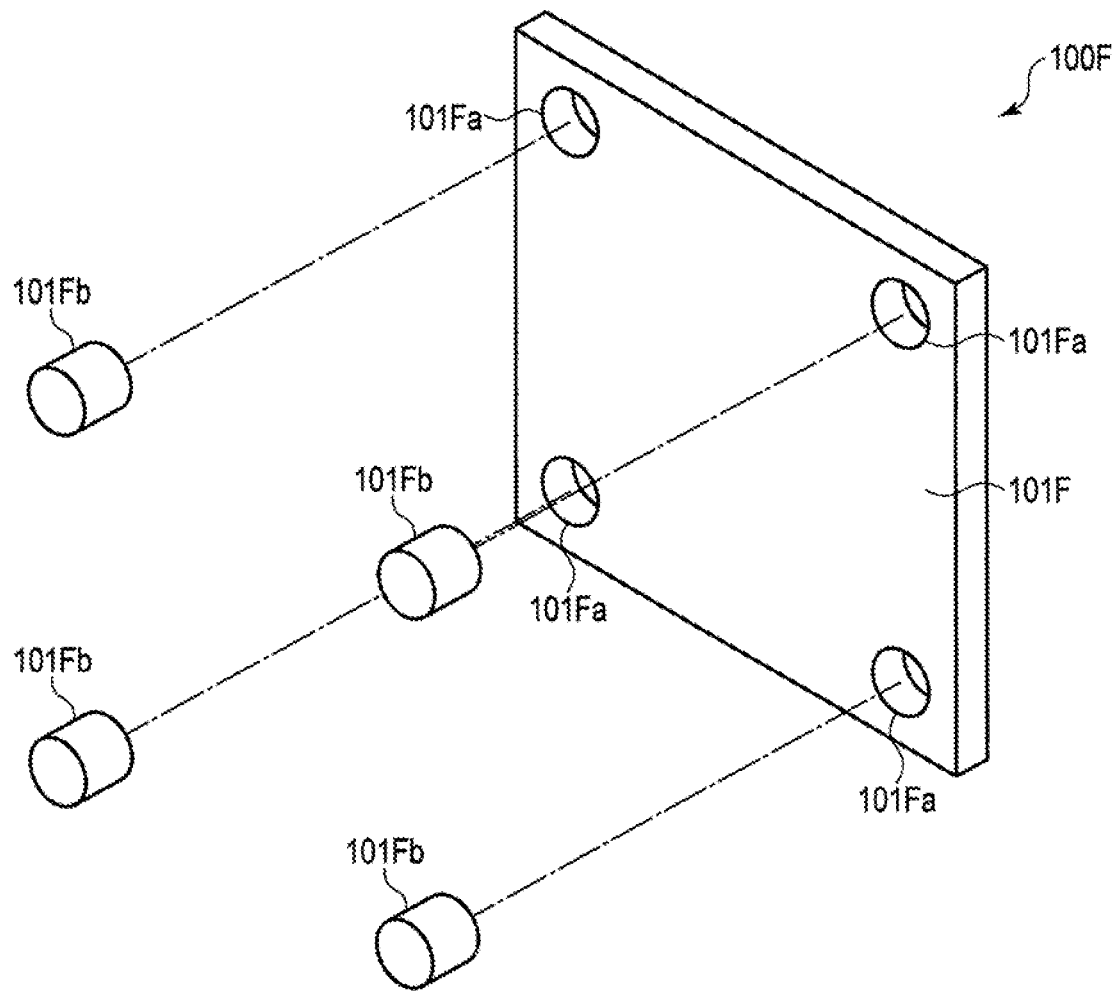
F I G. 23

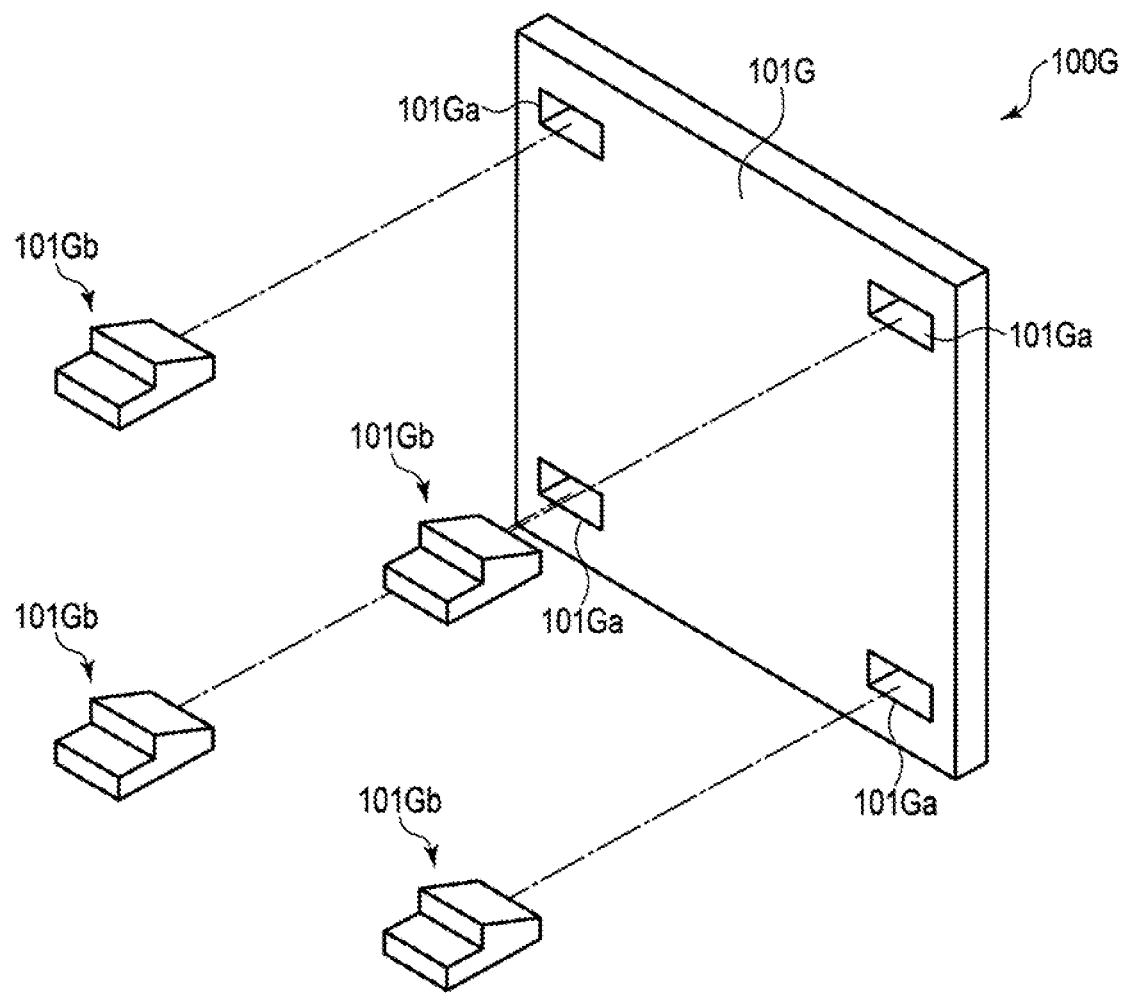
F I G. 25

BATTERY MODULE

CROSS-REFERENCE TO RELATED APPLICATION

This application is based upon and claims the benefit of priority from Japanese Patent Application No. 2017-043184, filed Mar. 7, 2017, the entire contents of which are incorporated herein by reference.

FIELD

Embodiments described herein relate generally to a battery module comprising a plurality of battery cells stacked one upon another.

BACKGROUND

As a relatively high-power secondary battery, a battery module is hitherto known in which a plurality of battery cells are stacked and assembled as a unit and are connected to one another in series or in parallel.

It is known in the art that a gas is generated inside a battery cell in accordance with the deterioration with time, and that the internal pressure in the battery cell increases, expanding the case of that battery cell. In a battery module wherein a plurality of battery cells are stacked one upon another, the case of a battery cell may expand, and the battery module may change in outer shape. It is also known that the battery module whose outer shape has changed has poor performance. In order to suppress the expansion of each battery cell, the stacked battery cells are constrained using a frame.

However, if the frame is too rigid, the battery module may not be assembled efficiently. Conversely, if the frame is not sufficiently rigid, expansion of the battery cells of the battery module cannot be suppressed.

Under the circumstances, there is a demand for a battery module in which the rigidity of the frame for constraining the battery cells increases in accordance with the expansion of the deteriorated battery cells and which can be assembled easily.

BRIEF DESCRIPTION OF THE DRAWINGS

FIG. 3 is a schematic view showing a main part of the battery module depicted in FIG. 1.

FIG. 11 is a graph showing the relation between the expansion of the battery cells of the first, second and third embodiments and the load exerted on frames.

FIG. 15 is a schematic view showing a second modification of what is depicted in FIG. 12.

FIG. 16 is a front view of a plate employed in the fifth embodiment.

FIG. 17 is a sectional view of the plate of the fifth embodiment, the sectional view being taken along line XVII-XVII in FIG. 16.

FIG. 18 is a front view of a plate employed in the sixth embodiment.

FIG. 19 is a sectional view of the plate of the sixth embodiment, the sectional view being taken along line XIX-XIX in FIG. 18.

FIG. 22 is an exploded perspective view illustrating a battery module according to the ninth embodiment.

FIG. 23 is an exploded perspective view illustrating a plate employed in the tenth embodiment.

FIG. 25 is an exploded perspective view illustrating a plate employed in the eleventh embodiment.

DETAILED DESCRIPTION

According to one embodiment, a battery module includes a block-like battery cell unit in which a plurality of battery cells and a plurality of separators are stacked, and a frame which constrains the battery cell unit in a stacking direction. The end separators provided at the respective ends in the stacking direction of the battery cell unit have angular portions opposed to the frame, and these angular portions of the end separators are away from the angular portions of the frame, with gaps interposed.

A battery module 1 according to the first embodiment will be described with reference to FIG. 1.

Figure 1:
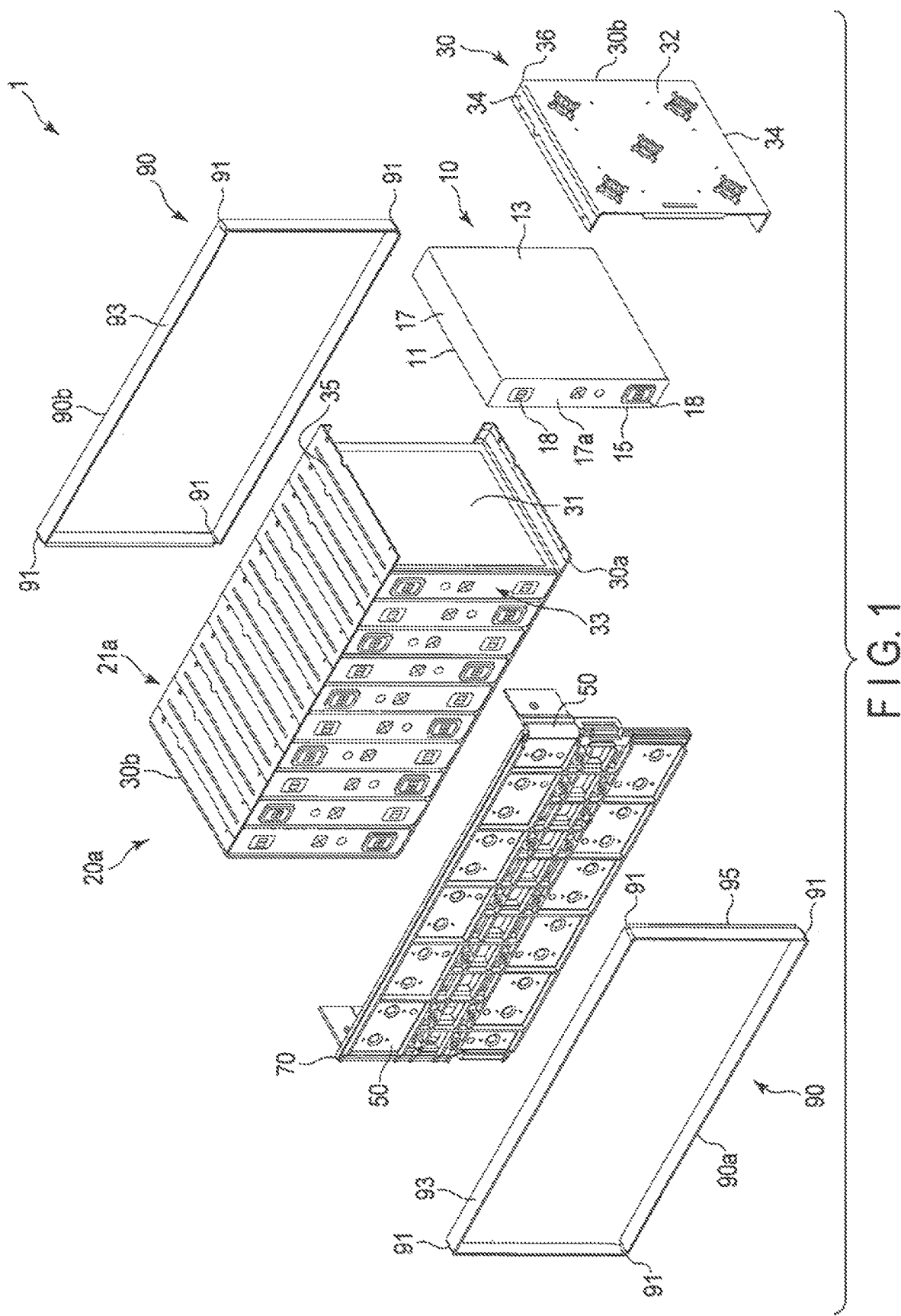
FIG. 1 is an exploded perspective view illustrating a battery module according to the first embodiment.

As shown in FIG. 1, the battery module 1 comprises a plurality of battery cells 10, a plurality of separators 30, a plurality of bus bars 50, a terminal-side frame 70, and a plurality of frames 90. In the present embodiment, for example eleven battery cells 10 and twelve separators 30 are alternately stacked in such a manner as to form a battery cell unit 21a. A stack structure 20a includes the battery cell unit 21a, and two frames 90a and 90b for constraining the battery cell unit 21a.

Each battery cell 10 includes a rectangular case 11. The case 11 includes a first wall 13 and a second wall 15 which are substantially square and opposed to each other in parallel, and four side walls 17 which connect the periphery of the first wall 13 and the periphery of the second wall 15. One of the side walls 17 is used as a terminal wall 17a. Two terminals 18 are provided on the terminal wall 17a in such a manner that they are away from each other. One of the two terminals 18 is a positive terminal and the other is a negative terminal. A nonaqueous electrolyte fills the interior of the case 11.

The battery cells 10 are arranged in such a manner that the terminal walls 17a of the cases 11 are oriented in the same direction. The terminal walls 17a face a terminal-side frame 70. The battery cells 10 are stacked in such a manner that the positive terminal and negative terminal of each adjacent pair of battery cells 10 alternate. The battery cells 10 are stacked, with the separators 30 interposed in between. With this structure, either the first walls 13 or the second walls 15 face each other in each adjacent pair of battery cells 10. The terminal walls 17a of the respective cases 11 function as the terminal face 33 of the stack structure 20a.

The separators 30 include ten first separators 30a interposed between the battery cells 10, and two second separators 30b located at the respective ends of the stack structure 20a as defined in the stacking direction. In the description below, the two types of separators 30a and 30b (namely, the first and second separators) may be referred to simply as separators 30. Each separator 30 is formed, for example, of an insulating resin material.

Each of the first separators 30a is a frame including a substantially square inner frame which has practically the same shape as the first wall 13 and second wall 15 of the battery cell 10. Each first separator 30a includes two band portions 35, which are wide as viewed in the stacking direction. The two band portions 35 are opposed to each other.

Each first separator 30a is interposed between the adjacent battery cells 10. In other words, each battery cell 10 is located between the two band portions 35 of the two first separators 30a arranged in the stacking direction. That is, each first separator 30a is assembled such that the two band portions 35 thereof face the side walls 17 of the case 11, and the terminal face 33 of the stack structure 20a is thus prevented from being covered with the band portions 35.

Each second separator 30b includes a substantially square end plate 32 which has practically the same shape as the first wall 13 and second wall 15 of the battery cell 10, and two side portions 34 integrally extending in the same direction from the opposite two sides of the end plate 32. Each second separator 30b is assembled such that the two side portions 34 thereof face the side walls 17 of the case 11, and the terminal face 33 of the stack structure 20a is thus prevented from being covered with the side portions 34. In other words, the two faces perpendicular to the terminal face 33 of the battery cell unit 21a are covered with the band portions 35 of the first separator 30a and the side portions 34 of the second separator 30b. A nut is provided on the outer side of the second separator 30b so that the battery module 1 can be fixed to an external case or the like by means of a bolt.

The frames 90 constrain the battery cell unit 21a in the stacking direction. The frames 90 are fixed in contact with part of the band portions 35 of the first separators 30a and part of the end plates 32 and side portions 34 of the two second separators 30b. The frames 90 include a first frame 90a shown as being located at the front in FIG. 1 (i.e., the frame close to the terminal face 33) and a second frame 90b shown as being located at the rear in FIG. 1. The first and second frames 90a and 90b are formed, for example, of a metallic material and are insulated. In the description below, the first and second frames 90a and 90b may be referred to simply as frames 90. The frames 90 need not be formed of a metallic material; they may be formed of a synthetic resin having sufficient mechanical strength.

Figure 2:
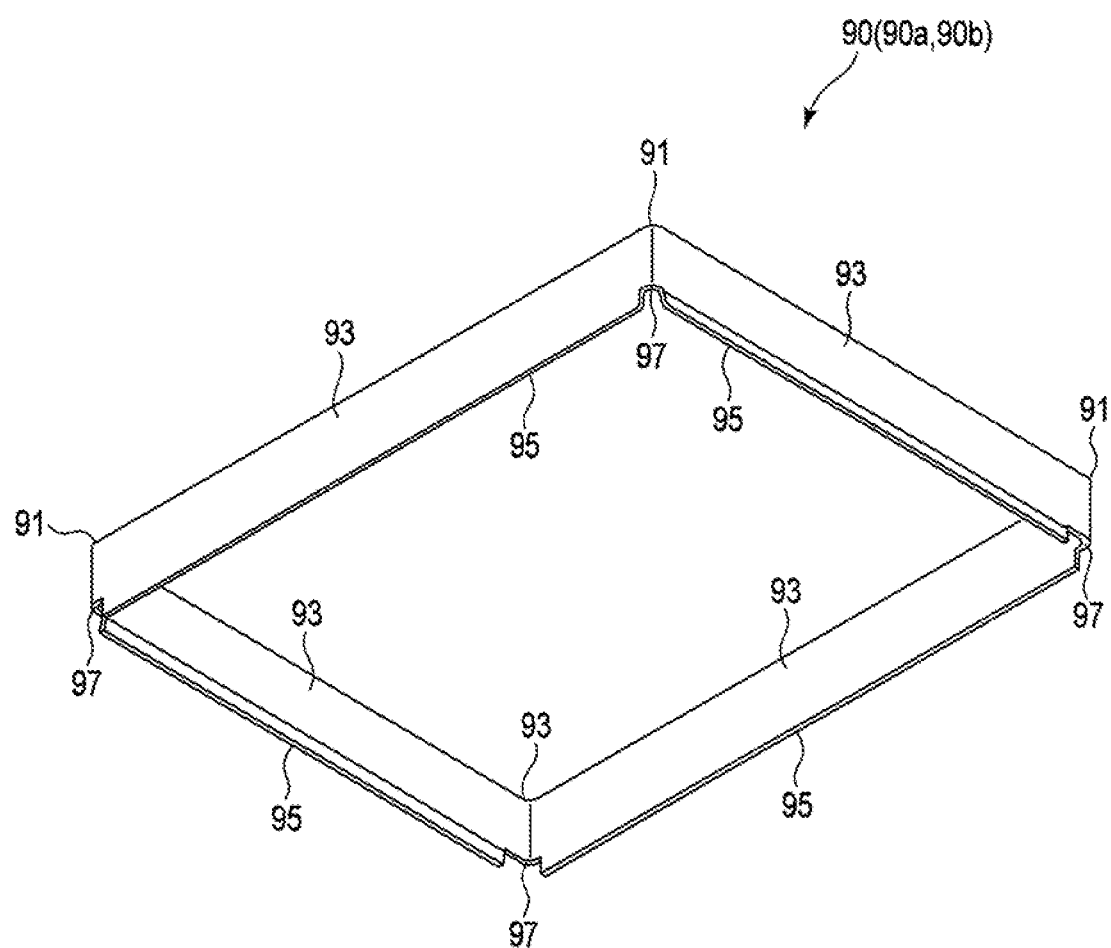
FIG. 2 is a perspective view showing a frame used in the battery module depicted in FIG. 1.

The frames 90 are rectangular and are somewhat larger than the end face 33 of the battery cell unit 21a. As shown in FIG. 2, each frame 90 includes four angular portions 91 and four peripheral walls 93. Of the four peripheral walls 93, a pair of longer peripheral walls 93 opposed to each other are made to face the band portions 35 and side portions 34 of the separators 30 in the fitted state of the frame 90.

As shown in FIGS. 1 and 2, each of the four peripheral walls 93 is provided with a tapered introduction plate 95 on one side thereof. The introduction plate 95 extends in the longitudinal direction of the peripheral wall and is slightly bent outward. When the frame 90 is fixed to the battery cell unit 21a, the introduction plates 95 serve to guide the peripheral portions of the battery cell unit 21a into the frame 90. The longitudinal ends of the four introduction plates 95 are away from each other. A recess 97 is formed at each corner portion 91 of the frame 90.

When the frame 90 having this structure is fitted on the battery cell unit 21a, the tapered surfaces of the introduction plates 95 serve as guides. Therefore, even an inexperienced operator can easily fit the frame 90 on the battery cell unit 21a.

As shown in FIG. 1, each bus bar 50 electrically connects the terminals 18 (positive and negative terminals) of the two battery cells 10 that are adjacent in the stacking direction. The bus bar 50 is a plate-like conductive member. As described above, the battery cells 10 are stacked in such a manner that the positive terminal and negative terminal of each adjacent pair of battery cells 10 alternate. With this arrangement, the terminals of the two battery cells that are adjacent in the stacking direction are different in polarity. That is, the bus bars 50 (50a) electrically connect the battery cells 10 together.

The terminal-side frame 70 is a frame that is arranged to face the terminal face 33 of the stack structure 20a. The terminal-side frame 70 includes a plurality of attachment window holes. A plurality of bus bars 50 are fitted in the respective attachment window holes of the terminal-side frame 70. The terminal-side frame 70 to which the bus bars 50 are attached is fixed to the terminal face 33 of the stack structure 20a. The bus bars 50 attached to the terminal-side frame 70 electrically connect the terminals 18 of the respective battery cells 10. The bus bars 50 and the terminals 18 are fixed, for example, by welding.

FIG. 3 is a schematic view showing the stack structure 20a, which is a main part of the battery module 1. Although FIG. 3 shows the same stack structure as the battery module depicted in FIG. 1, the illustration of part of the battery cells 10 is omitted for simplicity. The stack structure 20a includes a battery cell unit 21a and two frames 90a and 90b.

As described above, each second separator 30b includes an end plate 32 and two side portions 34 integral with the end plate 32, and has a substantially "U"-shaped section. Angular portions 36 are provided between the end plate 32 and the respective side portions 34. In the present embodiment, the end plate 32, the two side portions 34 and the angular portions 36 are made of a resin and are integrally formed as one piece.

The angular radius of the angular portions 36 of the second separator 30b is larger than the angular radius of angular portions 91 of the frame 90a. A gap 80 is provided between the angular portions 91 of the frame 90a and the angular portions 36 of the second separator 30b. That is, the gap 80 is provided between the frame 90a and the battery cell unit 21a. Because of the gap 80, the frame 90a can be elastically deformed when it is fitted on the battery cell unit 21a. Accordingly, the frame 90a can be easily fitted on the battery cell unit 21a. In short, the gap 80 enables easy assembly of the frame 90a.

Figure 4:
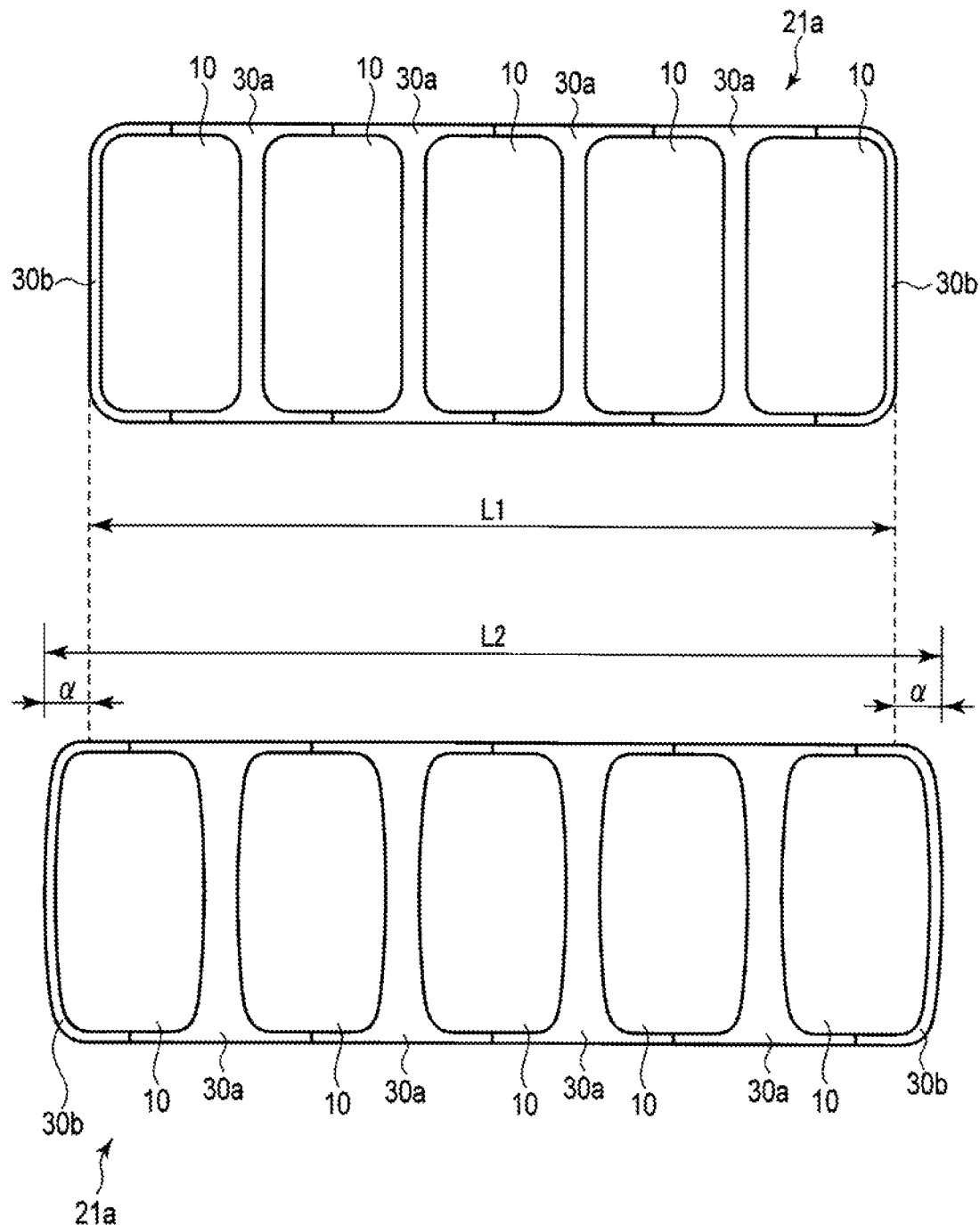
FIG. 4 is an explanatory view illustrating how the battery cell unit depicted in FIG. 3 is before and after expansion.

Next, the expansion of the battery cells 10 will be described with reference to FIG. 4. In FIG. 4, the illustration of the frame 90a is omitted so that the expansion of the battery module 1 can be easily understood.

FIG. 4 illustrates how the battery cell unit 21a is before it is expanded (in the upper half of FIG. 4), and also illustrates how the battery cell unit 21a is after it is expanded (in the lower half of FIG. 4). In FIG. 4, L1 denotes the length of the battery cell unit 21a containing unexpanded battery cells 10 (in the upper half of FIG. 4). After the battery cells 10 are expanded, the length of the battery cell unit 21a increases from L1 to L2 (the length increases by $\alpha$ at each end of the longitudinal direction). The angular portions of the adjacent battery cells 10 move away from each other in the longitudinal direction because the cases 11 are deformed. Due to the expansion of the battery cells, the second separator 30b at each end moves by $\alpha$ in the longitudinal direction.

Figure 5:
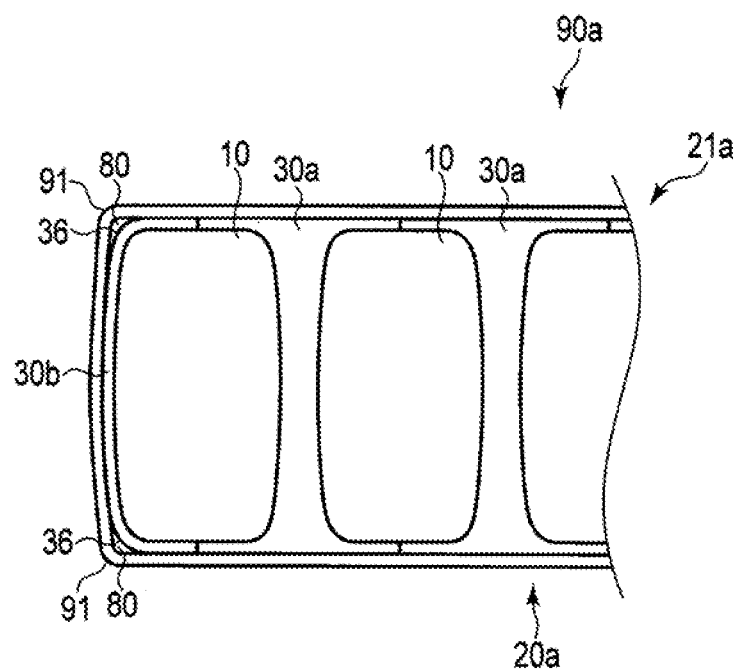
FIG. 5 is a schematic view illustrating a state in which the battery cells of the battery module depicted in FIG. 3 begin to expand.

As shown in FIG. 5, each battery cell 10 expands in accordance with an increase in the internal pressure. Accordingly, the case of each battery cell 10 is deformed. The pressure inside the battery cells 10 serves to push the second separators 30b against the short sides of the frame 90a. Pressed by the second separators 30b, the frame 90a expands outward. In other words, the angular portions 91 of the frame 90a are widened, and the angular portions 36 of the second separator 30b move toward the angular portions 91 of the frame 90a. As a result, the volume of the gaps 80 decreases.

The decrease in the volume of the gaps 80 means that the space between the battery cells 120 and the frame 90 is reduced.

Figure 6:
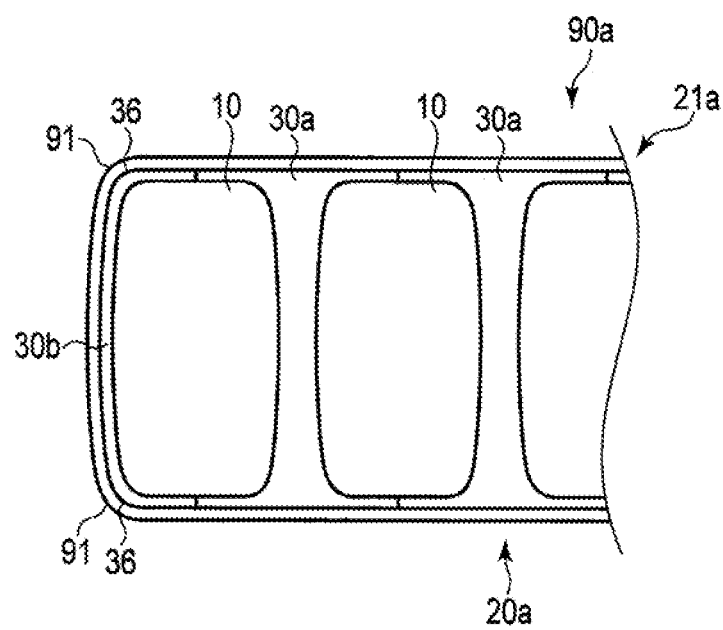
FIG. 6 is a schematic view illustrating a state in which the battery cells of the battery module depicted in FIG. 3 expand further.

When the battery cells 10 expand further shown in FIG. 6, there is scarcely a gap between the angular portions 91 of the frame 90a and the angular portions 36 of the second separator 30b. In other words, angular portions 36 come into contact with the inner sides of angular portions 91.

FIG. 11 is a graph in which the states of the stack structure of the first embodiment are plotted, including the states shown in FIGS. 3, 5 and 6. The horizontal axis represents an expansion rate of a battery cell. The vertical axis represents a frame load (the load with which the battery cells are constrained). FIG. 3 shows how the stack structure 20a is before the battery cells 10 expand (i.e., the state of the stack structure 20a at the time of assembly). FIG. 5 shows how the stack structure 20a is when the battery cells 10 expand a little. FIG. 6 shows how the stack structure 20a is when the battery cells 10 expand further than the state shown in FIG. 5.

In the unexpanded stack structure 20a, sufficient gaps 80 exist between angular portions 91 and angular portions 36. In this case, the load exerted on frame 90a is small, and the frame 90 can be easily fitted on the battery cell unit 21b. In the stack structure 20a shown in FIG. 5, the battery cells expand a little. In this case, the first separator 30a is pressed by the battery cell 10 on one side, and presses the battery cell on the other side. As a result, the first separator 30a is deformed a little. The second separator 30b is pressed by the battery cell 10, and presses the frame 90 from within. At the time, the angular portions 36 of the second separator 30b and the angular portions 91 of the frame 90 are deformed, reducing the gaps 80 between angular portions 36 and angular portions 91. In other words, in the stack structure shown in FIG. 5, the frame load increases in accordance with the expansion of the battery cells 10, as shown in FIG. 11.

In the stack structure 20a shown in FIG. 6, the battery cells 10 expand further. As can be seen, in the stack structure 20a, the second separator 30b and the frame 90 are deformed to such an extent that there are practically no gaps 80 between the second separator 30b and the frame 90. In other words, angular portions 36 are in contact with the inner sides of angular portions 91 in the stack structure 20a shown in FIG. 6. In this state, the frame load is significantly larger than the frame loads of the states shown in FIGS. 3 and 5. In the stack structure 20a shown in FIG. 6, practically no gap 80 exists between the frame 90 and the second separator 30b, with the result that the rigidity of the frame 90 increases and the battery cell unit 21b can be constrained reliably.

In the stack structure 20a of the first embodiment, gaps 80 are provided between the angular portions 36 of the second separators, located at the ends as viewed in the stacking direction, and the angular portions 91 of the frame 90. The gaps 80 enable the rigidity of the frame 90 to increase in accordance with the expansion of the battery cells 10. In other words, the frame 90 of the stack structure 20a changes its rigidity in accordance with the expansion of the battery cells due to the temporal deterioration of the battery cells 10. At the time of assembly, the frame 90 of the stack structure 20a can be easily assembled to the battery cell unit 21a. In addition, when the battery cells 10 expand, the stack assembly 20a has sufficient rigidity.

In other words, when the battery cells 10 expand after they are used for more than a certain period, the angular portions 36 of the second separators 30b are deformed in conformity with the angular portions 91 of the frame 90. As a result, the gaps 80, which can be regarded as an allowance of the stack structure 20a, are lost. In accordance with this, the load exerted on the frame 90 increases. The stack structure 20a in this state enables the battery cell unit 21a to be firmly constrained.

The frame 90 having increased rigidity prevents the battery cells 10 from expanding further, and suppresses the temporal performance deterioration of the battery module 1. As a result, the frame 90 lengthens the life of the battery module 1.

Figure 7:
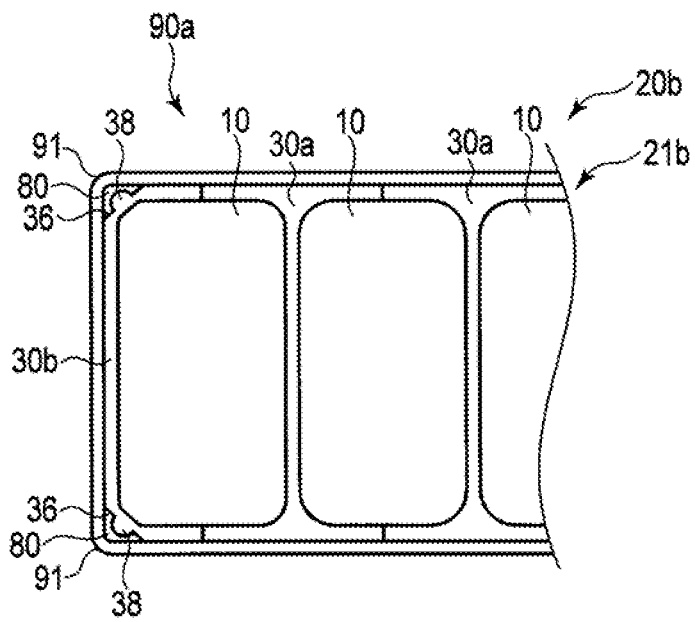
FIG. 7 is a schematic view showing a main part of a battery module according to the second embodiment.
Figure 8:
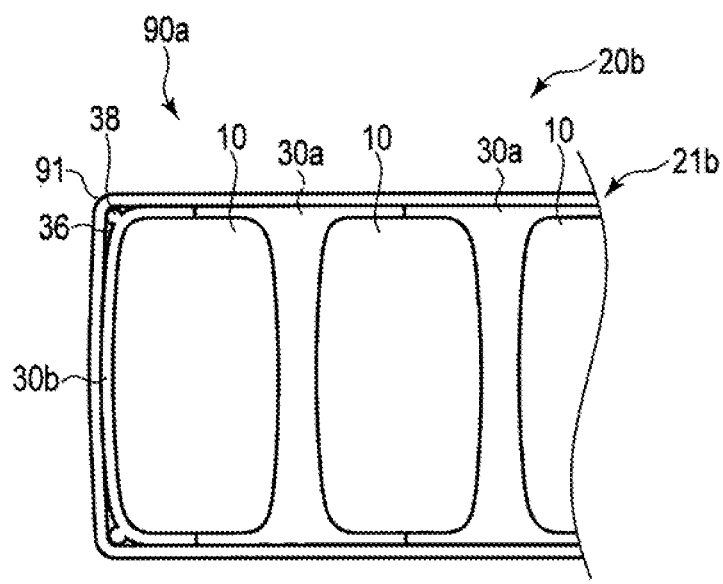
FIG. 8 is a schematic view illustrating a state in which the battery cells of the battery module depicted in FIG. 7 expand.

A shape of a separator 30 used in a stacking structure 20b according to the second embodiment will now be described with reference to FIGS. 7 and 8. FIG. 7 is a schematic view illustrating a main portion of the stacking structure 20b. FIG. 8 is a schematic view illustrating a state in which the battery cells 10 of the stacking structure depicted in FIG. 7 expand. In connection with the second embodiment, those members having similar functions or structures to those of the members of the first embodiment will be denoted by the same reference numerals and symbols, and a detained description of such members will be omitted.

The stacking structure 20b of the second embodiment differs from the stacking structure 20a of the first embodiment in that the angular portions 36 of the second separator 38 have a projection 38, as shown in FIG. 7.

In the stacking structure 20b having this structure, the gaps 80 are narrower than the gaps 80 between the first frame 90a and the second separator 30b of the stacking structure 20a of the first embodiment, by the dimension of the projection 38. In other words, the distance between the projection 38 and the corresponding angular portion of the first frame 90a is shorter than the distance between the angular portion 36 and angular portion 91 of the stacking structure 20a of the first embodiment.

As shown in FIG. 8, therefore, the projections 38 of the second separator 30b of the second embodiment come into contact with the angular portions 91 of the frame 90 in the state where the deformations of the battery cells 10 are smaller than those of the battery cells 10 of the stacking structure 20a of the first embodiment. With this structure, the stacking structure 20b suppresses the expansion of the battery cells 10 earlier than the stacking structure 20a of the first embodiment.

With this structure, stacking structure 20b is provided with gaps 80 and can be as flexible as stacking structure 20a when it is assembled to the frame 90, as can be seen in FIG. 11. When the battery cells 10 expand, the angular portions 91 of the frame 90 come into contact with the projections 30. Since the rigidity of the frame 90 is increased thereby, further expansion of the battery cells 10 is suppressed.

In the stacking structure 20b, the projections 30 and angular portions 91 come into contact with each other. Therefore, the ease with which the stacking structure 20b is assembled to the frame 90 can be adjusted by changing the size of the projections 38. Therefore, by adjusting the size of the projections, the stacking structure 20b enables the expansion rate of the battery cells 10 to be adjusted until the frame load increases rapidly.

In the stacking structure 20b, the projections are provided on the second separators 30b. The projections 38 are provided at such positions as correspond to the angular portions 91 of the frame 90. The operator can use the projections 38 as positioning guides when the frame 90 is attached. In other words, the projections 38 of the stacking structure 90 enable the frame 90 to be easily attached.

Figure 9:
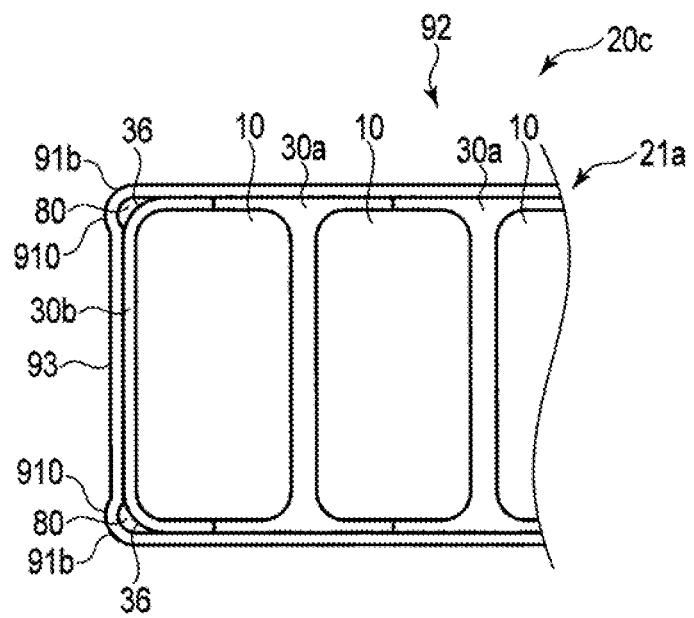
FIG. 9 is a schematic view showing a main part of a battery module according to the third embodiment.
Figure 10:
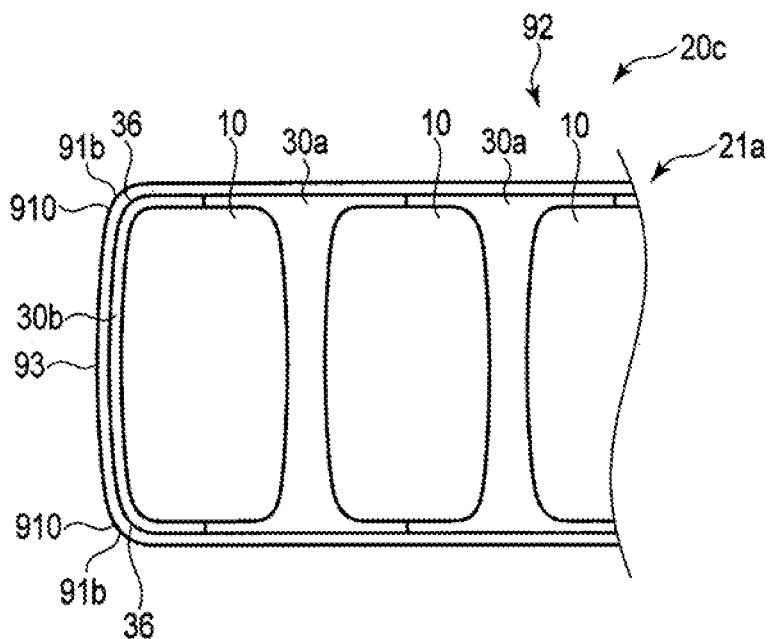
FIG. 10 is a schematic view illustrating a state in which the battery cells of the battery module depicted in FIG. 9 expand.

A stacking structure 20c according to the third embodiment will now be described with reference to FIGS. 9 and 10. FIG. 9 is a schematic view showing a main part of the stacking structure 20c of the third embodiment. FIG. 10 is a schematic view illustrating a state in which the battery cells 10 of the stacking structure depicted in FIG. 9 expand. In connection with the third embodiment, those members having similar functions or structures to those of the members of the first embodiment will be denoted by the same reference numerals and symbols, and a detained description of such members will be omitted.

The stacking structure 20c of the third embodiment differs from the stacking structure 20a of the first embodiment in that the angular portions 91b of the frame 92 have a curved portion 910, as shown in FIG. 9. To be more specific, the frame 92 is provided with portions 910 expanding outwardly from the frame 92. With this structure, the angular portions 91b of the frame 92 have more elasticity than that of the angular portions 91 of the frame 90 of the first embodiment.

According to the third embodiment, the shape of the frame 92 is modified without modifying the shape of the second separator 30b. The stacking structure 20c of the third embodiment suppresses the expansion of the battery cell unit 21b, and the frame 92 can be easily assembled to the stacking structure 20c.

The frame 92 has outwardly-expanding curved portions 910 at the angular portions 91b. The curved portions 910 are curved in directions away from the angular portions 36 of the second separators 30b. Accordingly, the stacking structure 20c of the third embodiment is provided with gaps 80 wider than those of the stacking structure 20a of the first embodiment.

As shown in FIG. 10, when the battery cells 10 expand due to an increase in the internal pressure of the battery cells 10, the second separator 30b is pressed against the frame 92 and is deformed, as in the stack structure 20a of the first embodiment. Pressed by the second separator 30b, the frame 92 is deformed outwardly.

To be more specific, as shown in FIG. 10, the curved portions 910 of the angular portions 91b of the frame 92 are pulled in accordance with the expansion of the battery cells 10. In accordance with the expansion of the battery cells 10, the angular portions 36 of the second separator 30b move toward the angular portions 91b of the frame 90. As a result, the angular portions 36 of the second separator 30b are pressed against the angular portions 91b of the frame 92. Since the angular portions 36 of the flame 92 are pressed by angular portions 91b, the rigidity of the frame 92 is increased rapidly, suppressing further expansion of the battery cells 10. In other words, the flexibility of the frame 92 decreases in accordance with a decrease in the size of the gaps 80.

With this structure, the stacking structure 20c is provided with angular portions 91b and can be flexible when it is assembled to the frame 92. As shown in FIG. 10, when the battery cells 10 expand, the curved portions 910 of the angular portions 91b of the stack structure 20c are expanded, and the angles of the angular portions 91b increase. As a result, angular portions 36 move toward angular portions 91b and are pressed against the inside of angular portions 91b. As can be seen in FIG. 11, the frame 92 is flexible when it is assembled to the battery cell unit 21a. After the battery cells 10 expand to a certain degree, the rigidity of the frame 92 increases, enabling the battery cell unit 21a to be secured firmly. As a result, the frame 92 can suppress further expansion of the battery cells 10.

According to the third embodiment, the gaps 80 are provided by modifying the shape of the frame 92 located on the outside of the separator 30. Therefore, the stack structure 20c enables the gaps 80 to be larger than those of the first and second embodiments. In addition, since the curved portions 910 are provided for the angular portions 91b of the frame 92, the stack structure 20c enables the frame 92 to be flexible. At the time of assembly, the frame 92 of the stack structure 20c can be easily assembled.

The fourth to tenth embodiments will be described with reference to FIGS. 12 to 25. In connection with the fourth to tenth embodiments, those members having similar functions or structures to those of the members of the first embodiment will be denoted by the same reference numerals and symbols, and a detained description of such members will be omitted.

Figure 12:
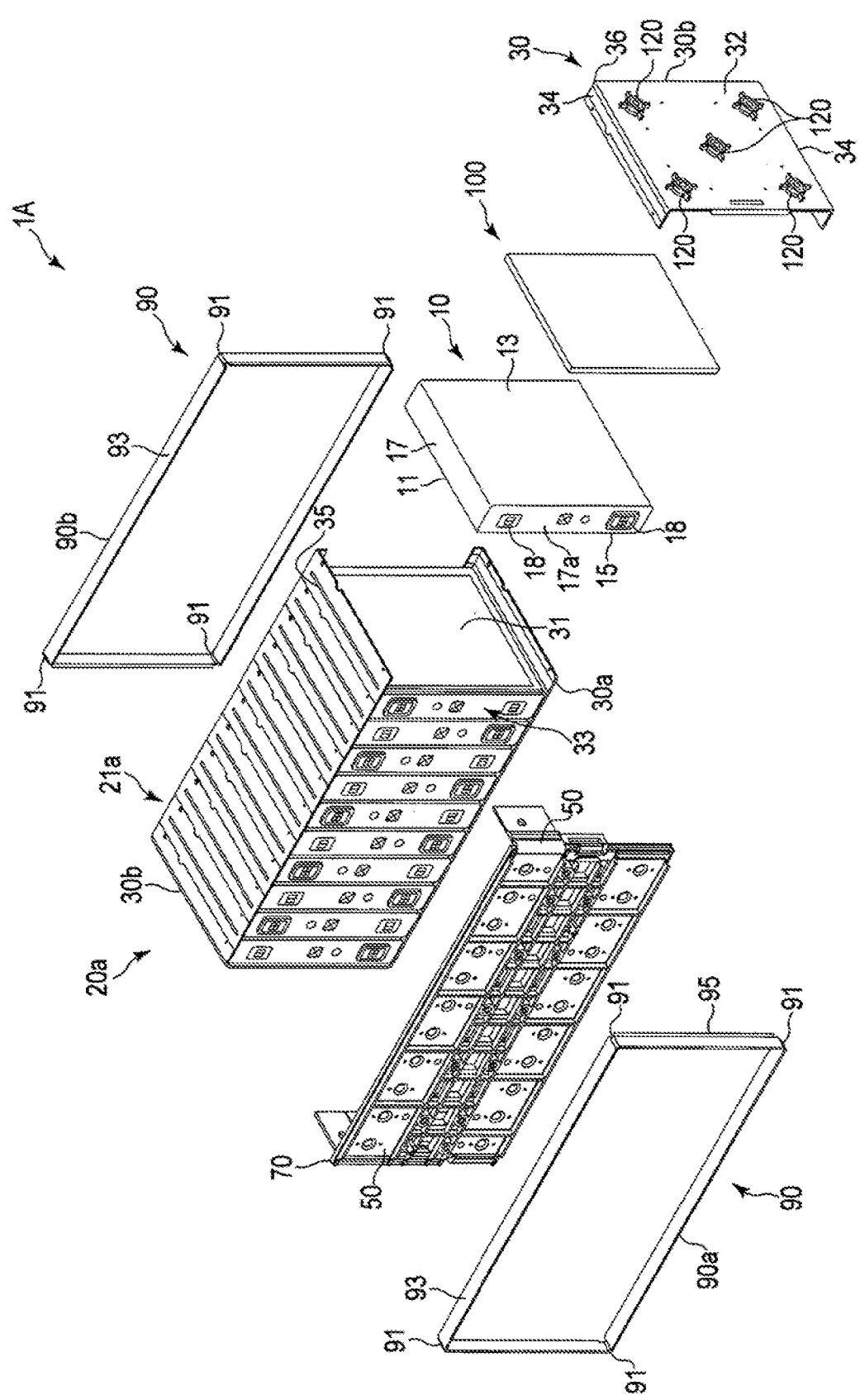
FIG. 12 is an exploded perspective view illustrating a battery module according to the fourth embodiment.
Figure 13:
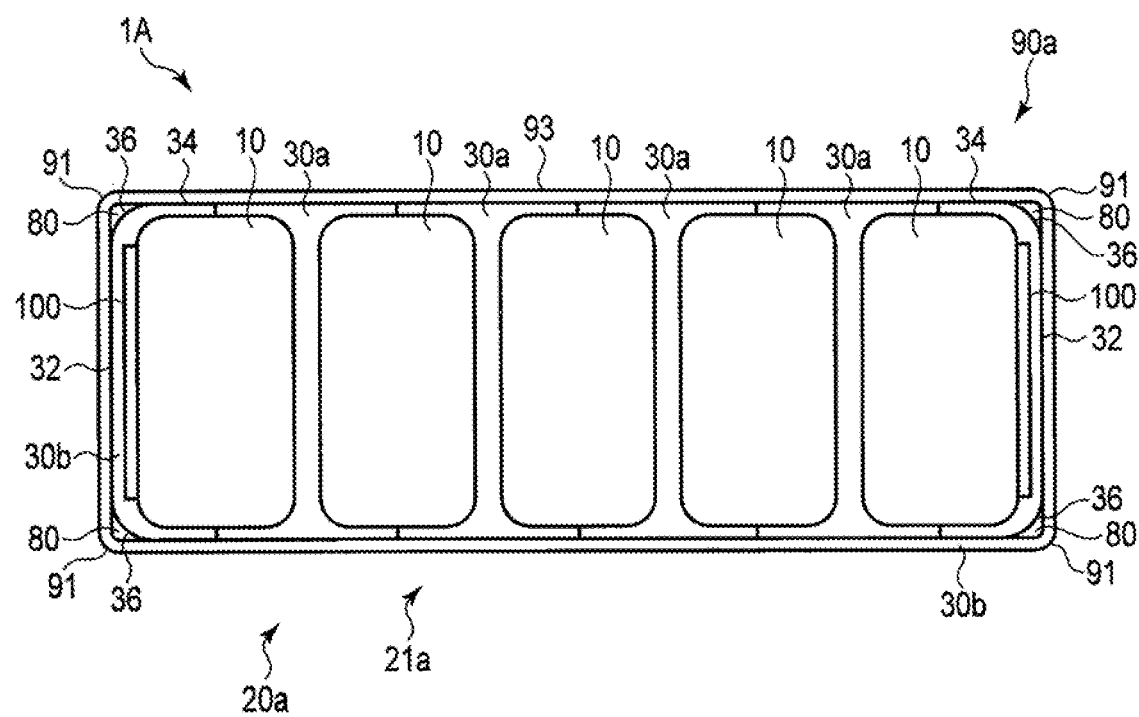
FIG. 13 is a schematic view showing a main part of the battery module depicted in FIG. 12.
Figure 14:
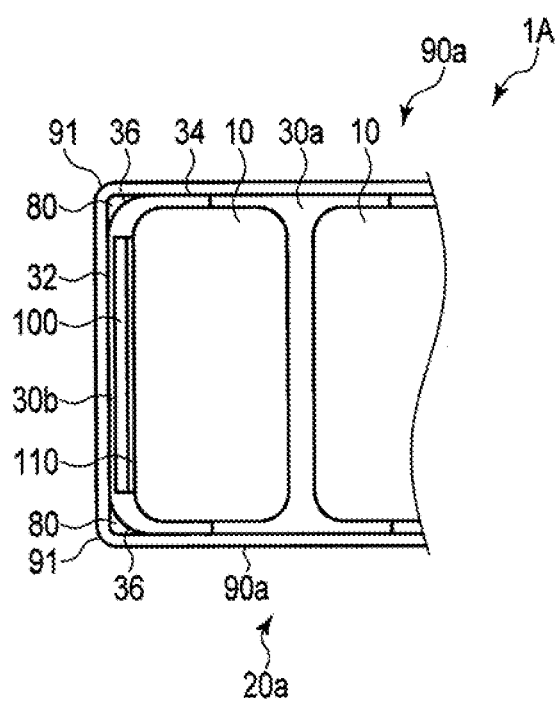
FIG. 14 is a schematic view showing a first modification of what is depicted in FIG. 12.

FIG. 12 is an exploded perspective view illustrating a battery module according to the fourth embodiment. FIG. 13 is a schematic view showing a main part of the battery module depicted in FIG. 12. FIG. 14 is a schematic view showing a first modification of what is depicted in FIG. 12. FIG. 15 is a schematic view showing a second modification of what is depicted in FIG. 12. In the battery module 1A of the fourth embodiment, a plate 100 is provided between a battery cell and a second separator 30b, as shown in FIG. 12. In this point, the battery module 1A of the fourth embodiment differs from the battery module 1 of the first embodiment.

The plate 100 is substantially and rectangular has major surfaces similar in shape to the first wall 13 of the battery cell 10. The plate 100 is a square plate and is so rigid that it is not curved when it is pressed by a load generated by an increase in the internal pressure of the battery cells 10. For example, the plate 100 is a metallic plate. The material of the plate 100 is not limited to a metal; it may be any kind of material as long as the plate 100 is not curved by the pressure which is applied to the plate 100 when the battery cells 10 expand.

With this structure, the battery module 1A constrains the stack structure 20a by means of the two frames 90 and includes the plate 100. The plate 100 serves to suppress the expansion of the battery cells 10 located at the ends. The plate 100 resists the load applied thereto in accordance with an increase in the internal pressure of the battery cells 10, and thus suppresses the deformation of the battery cells 10 when the battery cells 10 expand. In this manner, the plate 100 serves to suppress the expansion of the battery cells 10.

The plate 100 can be fixed to the battery cell 10 by use of an adhesive 110, as shown in FIG. 14. With this structure, the plate 100 is prevented from being shifted in position relative to the battery cell 10 even if the battery cell 10 expands and deforms. In other words, the use of the adhesive 110 prevents the plate 100 from sliding on the outer surface of the first wall 13 of the battery cell 10. The plate 100 may be attached to nuts 120 of the second separator 30b, as shown in FIG. 15. With this structure, the plate 100 is fixed by means of the bolts and nuts 120 which fix the battery module 1A to the case. Since the plate 100 is fixed to the case by means of the nuts 12, it is strong as compared with the case where it is simply arranged between the battery case 10 and the second separator 30b, and the deformation of the battery cell 10 can be suppressed. With the structure shown in FIG. 15, the battery module 1A can be fixed more reliably.

The fifth and sixth embodiments will be described with reference to FIGS. 16 to 19. In connection with the fifth and sixth embodiments, a description will be given of plates 100A and 100B, which are modifications of plate 100. FIG. 16 is a front view of plate 100A employed in the fifth embodiment. FIG. 17 is a sectional view of plate 100A of the fifth embodiment, which is taken along line XVII-XVII in FIG. 16. FIG. 18 is a front view of plate 100B employed in the sixth embodiment. FIG. 19 is a sectional view of plate 100B of the sixth embodiment, which is taken along line XIX-XIX in FIG. 18.

Plate 100A of the fifth embodiment includes a flat plate portion 101 and a projected portion 101a. The projected portion 101a is projected from the major surface of the plate portion 101. For example, the projected portion 101a includes portions which extend in the directions of the respective diagonal lines on the major surface of the plate 100 and intersect with each other. The projected portion 101a is shaped like "X." Like plate 100A of the fifth embodiment, plate 100B of the sixth embodiment includes a flat plate portion 101B and a projected portion 101Ba. The projected portion 101Ba is projected from the major surface of the plate portion 101B. For example, the projected portion 101Ba includes three linear portions extending in parallel to opposite sides of the major surface of the plate 100 and portions located at the longitudinal center of the three linear portions and being perpendicular to the three linear portions.

With these structures, plate 100A and plate 100B have increased bending rigidity. Because of this, plate 100A and plate 100B are hard to bend even if the load applied thereto increases in accordance with the expansion of the battery cells 10, and the fifth and sixth embodiment have this advantage in addition to the advantages of the fourth embodiment.

Figure 20:
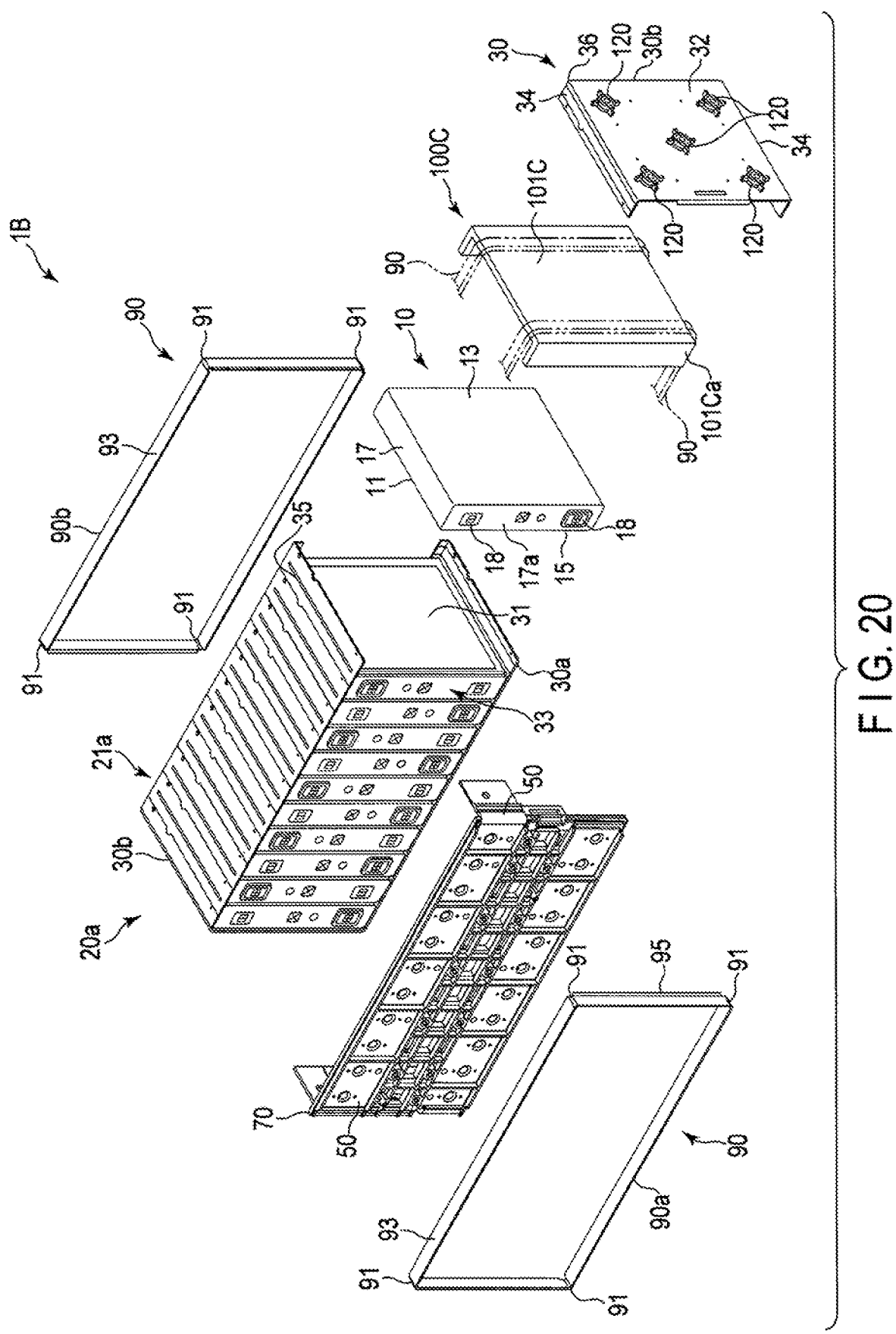
FIG. 20 is an exploded perspective view illustrating a battery module according to the seventh embodiment.
Figure 21:
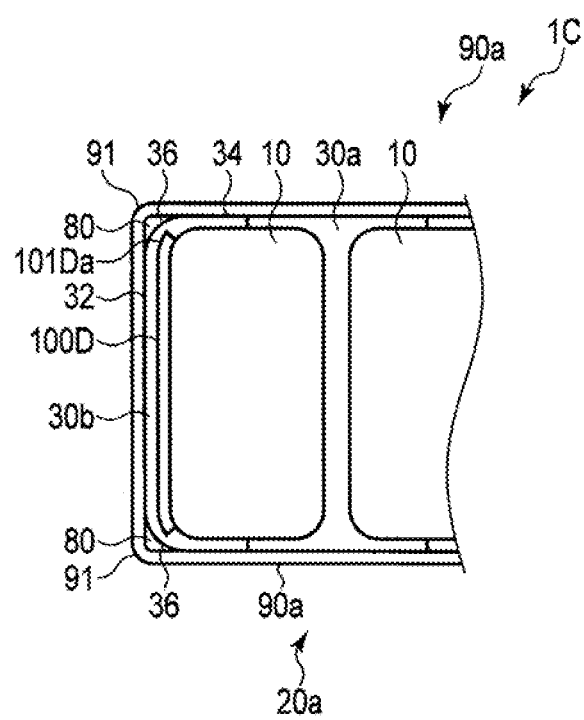
FIG. 21 is an explanatory view showing a main part of a battery module according to the eighth embodiment.

The seventh and eighth embodiments will be described with reference to FIGS. 20 to 21. FIG. 20 is an exploded perspective view illustrating a battery module 1B according to the seventh embodiment. FIG. 21 is an explanatory view showing a main part of a battery module 1C according to the eighth embodiment.

As shown in FIG. 20, plate 100C of the seventh embodiment includes a flat plate portion 101C and projections 101Ca formed like ribs. Projections 101Ca extend from two ends of the plate portion 101C, are perpendicular to the plate portion 101C, and face each other. The distance between the inner faces of the projections 101Ca, which face each other, is equal to the distance between the outer faces of the opposite side walls 17 of the battery cell 10. Plate 100C is engaged with the battery 10 when the inner faces of the projections 101Ca are brought into contact with the side walls 17 of the battery cell 10. Plate 100C is arranged on the battery cell 10 in such a direction that the projections 101a do not overlap the frame 90. The projections 101Ca are formed, for example, by bending end portions of a plate.

Since the plate 100C is provided with the two projections 101Ca mentioned above, the first wall 13 is prevented from being shifted from the position where it is installed when the plate 100C is arranged, even if the battery cells 10 expand. In this manner, the rigidity of the plate 100C does not deteriorate, and the expansion of the battery cells 10 can be suppressed.

Plate 100D of the eighth embodiment includes bent portions 101Da. Unlike the projections 101Ca of plate 100C, the bent portions 101Da are not like ribs, but they support the plate 100C when they are brought into plane contact with those corners of the battery cell 10 located at the respective widthwise ends of the side wall 17 by which the first wall 13 and the second wall 15 are connected.

Plate 100D having this structure has a similar advantage to that of plate 100C mentioned above.

Next, the ninth embodiment will be described with reference to FIG. 22. FIG. 22 is an exploded perspective view illustrating a battery module 1D according to the ninth embodiment.

Plate 100E of the ninth embodiment has a similar shape to that of plate 100C. Plate 100E of the ninth embodiment includes a flat plate portion 101E and ribs 101Ea. Plate 100E is has such a shape as can be obtained by rotating plate 100C by 90°. Plate 100E is provided in such a direction that the opposite ribs 101Ea overlap two frames 90.

Plate 100E having this structure is advantageous in that the bending rigidity can be improved in the direction that is perpendicular to the extending direction of the ribs 1Ea. Provided with the ribs 101Ea, the plate 100E is strong such that it can resist a load acting between the two frames 90 and causing the two sides perpendicular to the ribs 101Ea to move closer to each other. Accordingly, the plate 100E can suppress the deformation of the battery cells 10, together with the frames 90.

Figure 24:
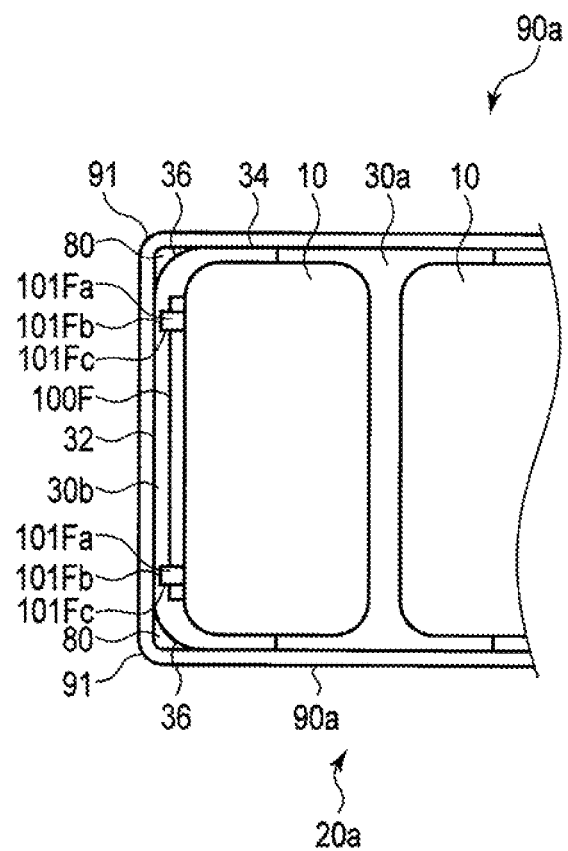
FIG. 24 is an explanatory view showing a main part of a battery module for which a plate is provided.

The tenth and eleventh embodiments will be described with reference to FIGS. 23 to 25. FIG. 23 is an exploded perspective view illustrating plate 100F employed in the tenth embodiment. FIG. 24 is an explanatory view showing a main part of a battery module 1E for which plate 100F is provided. FIG. 25 is an exploded perspective view illustrating plate 100G employed in the eleventh embodiment.

As shown in FIG. 23, plate 100F of the tenth embodiment includes a flat plate portion 101F, holes 101Fa and pins 101Fb. The holes 101Fa are through holes penetrating the plate 100F. The pins 101Fb are inserted into the respective holes 101Fa. Part of the one-end portions of the pins 101Fb are secured in recesses 101Fc formed in the inner face of the second separator 30b. The other end portions of the pins 101Fb are fixed to the first wall 13 of the battery cell 10.

As shown in FIG. 25, plate 100G of the eleventh embodiment includes a flat plate portion 101G, rectangular holes 101Ga and pins 101Gb. The holes 101Ga are through holes penetrating the plate 100G. The pins 101Gb are inserted into the respective holes 101Ga. Part of the one-end portions of the pins 101Gb are secured in recesses 101Fc formed in the inner face of the second separator 30b. The other end portions of the pins 101Gb are fixed to the first wall 13 of the battery cell 10. In the eleventh embodiment, the pins 101Gb have a so-called snap-fit structure.

Plate 100F having the structure described above is fixed to both the second separator 30b and battery cell 10 by means of pins 101Fb. Even if the battery cells 10 are deformed, the contact plane between the plate 100F and the first wall 13 is prevented from moving, and plate 100F is prevented from sliding on the face of the first wall 13. On the other hand, the pins 101Gb of plate 1000 have a snap-fit structure and do not have to be forcibly inserted into the holes at the time of assembly, so that easy assembly is ensured. Plate 100G has this advantage in addition to the advantage of plate 100F.

For example, the angular portions 36 of the second separators 30b are not limited to arch shapes. For example, the angular portions 36 may be substantially right-angled portions. In the present embodiment, the battery cell unit is constrained by means of two frames, but the method for constraining the battery cell unit is not limited to this. For example, the battery cell unit may be constrained by a single frame or by three or more frames.

A stack structure can be formed by combining the second separators 30b described in relation to the second embodiment (which have projections 38) with the frame 92 described in relation to the third embodiment. The curved portions 910 of the frame 92 described in the third embodiment may not be fully expanded but may be curved somewhat in an arch shape, when the battery cells 10 expand. In such a case as well, the frame 92 has increased rigidity from the points at which the curved portions 910 expand to a certain extent, thereby enabling the battery cell unit 21b to be constrained reliably.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit. The accompanying claims and their equivalents are intended to cover such forms or modifications as would fall within the scope and spirit.

The invention claimed is:

1. A battery module comprising:
   a block-like battery cell unit in which a plurality of battery cells and a plurality of separators are stacked;
   a frame which is formed of a single member adapted to be fitted on the battery cell unit from a terminal face side of the battery cell unit and which restricts the battery cell unit in a stacking direction of the battery cells and the separators, the frame comprising angular portions which are opposed to angular portions of end separators located at respective ends of the battery cell unit, as viewed in the stacking direction, and which define gaps with reference to the angular portions of the end separators, the end separators each comprising an end plate and two side portions integrally extending in the same direction from the opposite two sides of the end plate, and the frame being rectangular shaped and including four inner surfaces forming an inner periphery of the frame and which, when fitted on the battery cell unit, contact respective four outer faces of the battery cell unit that are other than a terminal face of the battery cell unit and that are adjacent to the terminal face; and
   rectangular plates which are provided adjacent to the end separators at the respective ends and are located between the battery cells and the end separators at the respective ends, the rectangular plates having rigidity that prevents the rectangular plates from being curved when the rectangular plates are pressed by a load generated by an increase in internal pressure of the battery cells.

2. The battery module according to claim 1, wherein the gaps decrease in size in accordance with expansion of the battery cells.

3. The battery module according to claim 1, wherein the angular portions of the end separators arranged at the respective ends come into contact with the angular portions of the frame, due to the expansion of the battery cells.

4. The battery module according to claim 1, wherein the frame extends in accordance with expansion of the battery cells, and has rigidity increased in accordance with a decrease in size of the gaps formed between the angular portions of the end separators located at the respective ends and the angular portions of the frame opposed thereto.

5. The battery module according to claim 1, wherein the angular portions of the end separators arranged at the respective ends comprise projections projected toward the respective angular portions of the frame.

6. The battery module according to claim 1, wherein the angular portions of the frame comprise curved portions curved in directions away from the angular portions of the end separators.

7. The battery module according to claim 1, wherein each of the rectangular plates includes a linear projection formed in a center thereof.

8. The battery module according to claim 1, wherein each of the rectangular plates includes ribs formed on peripheral portions thereof, the ribs extending in a direction intersecting with a major surface of each of the plates and facing each other.

9. The battery module according to claim 8, wherein the ribs, together with the separators, are restricted by the frame.

10. The battery module according to claim 1, wherein the rectangular plates are secured by means of a plurality of pins which are inserted into holes of the plates and which engage with the separators.

11. The battery module according to claim 1, wherein each of the rectangular plates includes a nut which extends from a separator-side major surface and which is exposed outside the separators.

* * * * *